(12) United States Patent
Hairman (10) Patent No.: US 8,682,838 B2
(45) Date of Patent: Mar. 25, 2014

(54) DYNAMICALLY RESPONSIVE VIRTUAL CHARACTERS

(75) Inventor: Robert Hairman, Los Angeles, CA (US)

(73) Assignee: Brainpool, Inc., Newport Beach, CA (US)

( * ) Notice: Subject to any disclaimer, the term of this patent is extended or adjusted under 35 U.S.C. 154(b) by 242 days.

(21) Appl. No.: 13/175,809

(22) Filed: Jul. 1, 2011

(65) Prior Publication Data

US 2011/0320965 A1 Dec. 29, 2011

Related U.S. Application Data

(63) Continuation-in-part of application No. 12/794,515, filed on Jun. 4, 2010, now abandoned, which is a continuation of application No. 11/612,999, filed on Dec. 19, 2006, now Pat. No. 7,734,562.

(60) Provisional application No. 60/766,114, filed on Dec. 30, 2005.

(51) Int. Cl.
 *G06F 17/00* (2006.01)
(52) U.S. Cl.
 USPC .......................................... 706/55; 715/706
(58) Field of Classification Search
 USPC ............................................ 706/55; 715/706
 See application file for complete search history.

(56) References Cited

U.S. PATENT DOCUMENTS

| | | | | |
|---|---|---|---|---|
| 6,507,353 | B1 * | 1/2003 | Huard et al. | 715/863 |
| 7,778,948 | B2 * | 8/2010 | Johnson et al. | 706/45 |
| 2003/0028498 | A1 * | 2/2003 | Hayes-Roth | 706/17 |
| 2007/0156625 | A1 * | 7/2007 | Visel | 706/62 |
| 2007/0250464 | A1 * | 10/2007 | Hamilton | 706/14 |
| 2007/0282765 | A1 * | 12/2007 | Visel et al. | 706/14 |

* cited by examiner

*Primary Examiner* — Jeffrey A Gaffin
*Assistant Examiner* — David H Kim
(74) *Attorney, Agent, or Firm* — McDermott Will & Emery LLP (57) ABSTRACT

Methods for conducting a virtual simulation are provided. In one aspect, a method includes receiving a request to generate a virtual simulation between a user and a virtual character, generating the virtual simulation for the user that includes the virtual character, and determining a desired outcome from the user within the virtual simulation. The method also includes selecting a strategy, from among a plurality of strategies, for achieving the desired outcome from the user, selecting an enactment for the selected strategy, from among a plurality of enactments, for the virtual character to execute to achieve the desired outcome from the user in the virtual simulation, and controlling the virtual character to execute the selected enactment for the selected strategy to achieve the desired outcome from the user in the virtual simulation. Systems, graphical user interfaces, and machine-readable media are also provided.

20 Claims, 7 Drawing Sheets

FIG. 1A

Exemplary Strategies 160

| | | |
|---|---|---|
| Announcing | Dupe | MortalFear |
| Antagonizing | Dying | Narrating |
| Appeasing | Empathizing | Negotiating |
| AssessingFriend | Enchanting | Notice |
| AssessingEnemy | Enticing | OfferingHelp |
| Attracting | Entraping | Persuading |
| Baiting | EscapingDanger | Playing |
| BaitAndSwitch | Examine | Pleading |
| Bantering | Expressing Shame | Pleading Forgiveness |
| Befriending | Fight | PleadingForHelp |
| Beguiling | Fistfight | Plotting |
| Belittling | Flashback | PlotExposition |
| BenignInterrogation | Flatter | Point of Illumination |
| Bewitching | Flee | Pretending |
| Blackmailing | Flirt | Preventing |
| Bonding | Force | ProclaimingInnocence |
| Bribing | Foreshadow | ProclaimingCorrectness |
| Bulldozing | Gatekeeper | Provoking |
| Bullying | GetAround | Pushing |
| Butteringup | Gladhand | Questioning |
| Cajoling | GoodCopBadCop | Reassuring |
| Challenging | Greeting | RemorsefulyConfessing |
| Charming | GreetingFriend | Repelling |
| Charming | Guarding | RequestingInformation |
| Chorus | Gunfighting | Revealing |
| Clowning | Hooking | Revealingsubtext |
| Coaxing | Hubris | Reviewing RecentAction |
| Coercing | Ignoring | Sacrificing |
| Colluding | Inducing | Seducing |
| ComingOn | IntroducingAPersonOf | Selling |
| ComicMenacing | Lesserstatus | SettingUpAHit |
| ComicRelief | IntroducingAPersonOfGre | Shapeshifting |
| Comply | aterSt | Shoving |
| Conning | atus | Showingoff |
| Conceal | IntroducingAPersonOfEqu | Snubbing |
| Confiding | alStat | Softening |
| Confronting | US | Softsoaping |
| Conspiring | Influence | Stealing |
| ConspiringIntimately | Insult | Stonewalling |
| Criticizing | Insulting | SuggestingAction |
| Crowding | Interrogate | TakingATangent |
| Dancing | Inveigle | Tantalizing |
| Dangerseeking | Inviting | Teasing |
| Darkcomedic | JournalisticInquiry | Tempting |
| Dazzling | KungFu | Testing |
| Deceiving | Leading | TestingAllegiance |
| Decoying | Leadingon | Threatening |
| Deluding | Luring | Tricking |
| DemandingInformation | MakingACase | Turningon |
| Detering | Making a deal | |
| Discouraging | Maneuver | |
| Disinforming | Mentor | |
| Dissuade | Messenger | FIG. 1B |
| Distract | Metaphor | |
| Distraction | Misinforming | |
| Draw | Misleading | |

Exemplary User Inputs 170

| | | |
|---|---|---|
| Accept | Delighted | Joyful |
| Appreciative | Disagree | Nervous |
| Accusing | Determined | Oneupping |
| Acknowledging | Disappointment | Outrage |
| AcknowledgingGuilt | Disbelieving | Panicking |
| Adamant | Disdain | Pleading |
| Affirm | Disgusted | Proud |
| Agree | Dismissing | ProvingAPoint |
| Aggressive | Doubting | Put Down |
| Alert | Eager | Questioning |
| Angry | Embarrased | ReactingToADamningDisc |
| Angriest | Empathetic | overy |
| Annoyed | Encouragement | Relief |
| Anxious | Emphasizer | Resentful |
| Apologetic | Enquiry | Righteous |
| Appealer | Entreaty | Sad |
| Approval | Exclamation | Satisfied |
| Asking | Excited | Scornful |
| Blaming | ExpectationsDashed | SelfDeprecating |
| Boasting | Evaluating | Shock |
| Booster | Exasperated | Sincere |
| Bored | Fear | Sneering |
| Bristling | Flirting | Solution |
| CallOff | Friendly | SquashingAChallenge |
| Challenging | Frustrated | Stalling |
| Check | Greeting | Stoic |
| Closer | Hedging | Stunned |
| ComeOn | Honesty | Surprised |
| Concealing | Hopeless | Suspicious |
| Concern | Horrified | Sympathetic |
| Confirm | Hostile | Teasing |
| Confused | Humiliated | Than king |
| Conviction | Impatient | Threatened |
| Coveringup | Indignant | Triumphant |
| Deciding | Insulted | Unyielding |
| Decided | Intrigued | |
| Defensive | Inviting | |

DYNAMICALLY RESPONSIVE VIRTUAL CHARACTERS

CROSS-REFERENCE TO RELATED APPLICATIONS

The present application claims the benefit of priority under 35 U.S.C. §120 as a continuation-in-part from U.S. patent application Ser. No. 12/794,515, entitled "Interactive Computer Characters to Interact Using Realistic Narrative With Humans," filed on Jun. 4, 2010, now abandoned, which claims priority as a continuation application from U.S. application Ser. No. 11/612,999, filed Dec. 19, 2006, now U.S. Pat. No. 7,734,562, which claims priority to U.S. Provisional Patent Application Ser. No. 60/766,114, filed on Dec. 30, 2005, the disclosures of which are hereby incorporated by reference in their entirety for all purposes.

BACKGROUND

1. Field

The present disclosure generally relates to computers, and more particularly to virtual simulations generated using computing devices.

2. Description of the Related Art

Virtual simulations, such as those generated by computers or video game consoles, permit a user to interact with a virtual world. If the virtual world includes a virtual character controlled by a computer, the user can often interact with the virtual character in the virtual world by talking to or physically engaging with the virtual character. Such virtual characters, however, are limited in their ability to engage with the user.

For example, in such virtual simulations, which can be video games, a user must often select from a predetermined list of actions (e.g., statements and/or physical movements) to interact with a virtual character. The virtual character is pre-programmed to respond to each of those predetermined actions. As a result, there are a small number of predictable outcomes for the virtual simulation. Both the user's level of engagement with the virtual simulation and the user's desire to repeat the virtual simulation is significantly reduced due to the predictability of interactions with virtual characters.

SUMMARY

According to one embodiment of the present disclosure, a method for conducting a virtual simulation between a user and a virtual character. The method includes receiving a request to generate a virtual simulation between a user and a virtual character, generating the virtual simulation for the user that includes the virtual character, and determining a desired outcome from the user within the virtual simulation. The method also includes selecting a strategy, from among a plurality of strategies, for achieving the desired outcome from the user, selecting an enactment for the selected strategy, from among a plurality of enactments, for the virtual character to execute to achieve the desired outcome from the user in the virtual simulation, and controlling the virtual character to execute the selected enactment for the selected strategy to achieve the desired outcome from the user in the virtual simulation.

According to another embodiment of the present disclosure, a system for conducting a virtual simulation between a user and a virtual character is disclosed. The system includes a memory and a processor. The memory includes a group of strategies for achieving one or more desired outcomes from a user and a group of enactments, associated with the strategies, for a virtual character to execute to achieve the one or more desired outcomes from the user for a corresponding strategy. The processor is configured to receive a request to generate a virtual simulation between a user and a virtual character, generate the virtual simulation for the user that includes the virtual character, and determine a desired outcome from the user within the virtual simulation. The processor is also configured to select a strategy, from the group of strategies, for achieving the desired outcome from the user, select an enactment from the group of enactments for the selected strategy for the virtual character to execute to achieve the desired outcome from the user in the virtual simulation, and control the virtual character to execute the selected enactment for the selected strategy to achieve the desired outcome from the user in the virtual simulation.

According to a further embodiment of the present disclosure, a virtual simulation between a user and a virtual character is disclosed. The virtual simulation includes a virtual world, a user character within the virtual world, and a virtual character within the virtual world configured to interact with the user character to achieve a desired outcome from the user character. The virtual character is configured to execute a selected enactment, selected from a group of enactments, for a selected strategy, selected from a group of strategies, to achieve the desired outcome from the user character in the virtual simulation.

According to yet a further embodiment of the present disclosure, a machine-readable storage medium comprising machine-readable instructions for causing a processor to execute a method for conducting a virtual simulation between a user and a virtual character is disclosed. The method includes receiving a request to generate a virtual simulation between a user and a virtual character, generating the virtual simulation for the user that includes the virtual character, and determining a desired outcome from the user within the virtual simulation. The method also includes selecting a strategy, from among a plurality of strategies, for achieving the desired outcome from the user, selecting an enactment for the selected strategy, from among a plurality of enactments, for the virtual character to execute to achieve the desired outcome from the user in the virtual simulation, and controlling the virtual character to execute the selected enactment for the selected strategy to achieve the desired outcome from the user in the virtual simulation.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1B is an exemplary listing of strategies from the strategies data in the memory of the exemplary client of FIG. 1A.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides a virtual simulation in which virtual characters can engage with a user based on outcomes the virtual characters seek from the user, and not according to interactions scripted in advance. Specifically, the virtual simulation generates a story for a user to engage in after the user enters the disclosed virtual simulation, and the virtual simulation then selects virtual characters and actions for those characters to engage with the user in order to advance the story. The virtual simulation processes any input received from the user and responds to the input by selecting a strategy for a virtual character to enact in order to further advance the story. As a result, each virtual character in the simulation can walk, talk, and act, and appear to the user to have intelligent, natural language conversations in real time with the user. The virtual characters' emotions, actions, moods, gestures, facial expressions, and language appear to be affected and visibly altered by user interplay. Virtual characters respond to input via human speech and/or typed language, and can understand what a user says and thereafter react dramatically to the input.

For example, after a user enters the virtual simulation, the virtual simulation can determine that the user needs an inciting incident in order to begin a story for the user to engage in. The virtual simulation can then select a strategy of "identifying" for a virtual character to enact because the virtual simulation determines identification to be the best first step for generating an inciting incident for the specific user. The strategy of identifying causes the virtual character to identify itself to the user. Once the virtual character is assigned the strategy of identifying itself, the virtual simulation chooses certain actions for the virtual character to enact, and then has the virtual character enact those actions to the user. The virtual character then announces its name and points to itself, and asks the user for the user's name. The user can then respond by talking to the virtual character. If the virtual simulation determines the user has responded by providing the user's name, using, for example, natural language recognition, the strategy of identification is determined to be complete and virtual simulation can proceed to a next strategy for generating an inciting incident. If the virtual simulation determines the user has not responded by providing the user's name, the strategy of identification is determined to be incomplete and other actions are selected for the virtual character to enact to attempt to have the user provide the user's identification to the virtual character. When virtual simulation determines the user has responded by providing the user's name, the virtual simulation can proceed to a subsequent strategy for generating an inciting incident. Additional virtual characters enacting different strategies can appear to the user based on various factors, such as the user's place in the story, what the user has said so far, and how the virtual simulation determines a next event should be reached until a final event to end the story is determined by the simulation and successfully completed by the user.

Figure 1A:
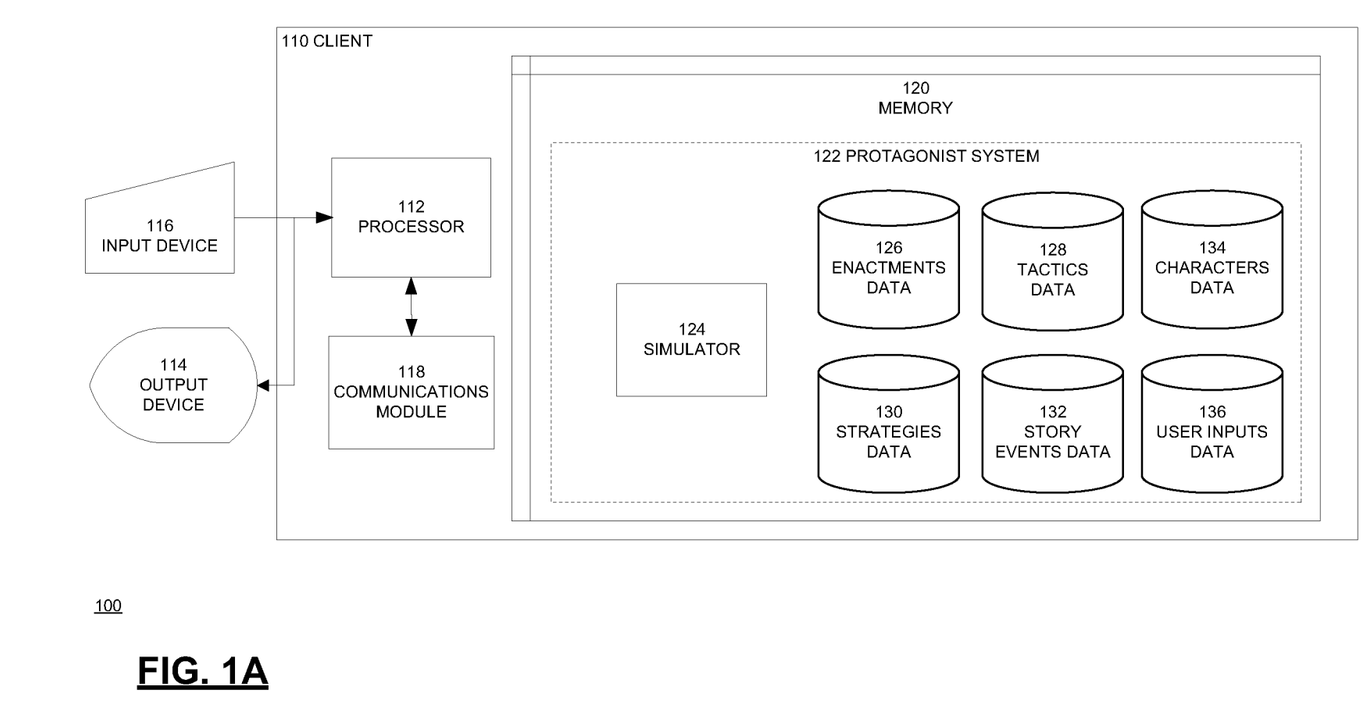
FIG. 1A is a block diagram illustrating an exemplary client for conducting a virtual simulation according to certain aspects of the disclosure.

Turning to the drawings, FIG. 1A is a block diagram 100 illustrating an exemplary client 110 for conducting a virtual simulation according to certain aspects of the disclosure. The client 110 includes a processor 112, a communications module 118, and a memory 120 that includes the Protagonist system 122. The Protagonist system 122 includes a simulator 124, enactments data 126, tactics data 128, characters data 134, strategies data 130, story events data 132, and user inputs data 136. The client 110 also includes an input device 116, such as a keyboard or mouse, and an output device 114, such as a display. The client 110 can be, for example, a desktop computer, mobile computer, tablet computer, mobile device (e.g., a smartphone or PDA), set top box (e.g., for a television), video game console, or any other device having appropriate processor, memory, and communications capabilities for executing the Protagonist system 122.

The Protagonist system 122 in the memory 120 of the client 110 is configured to generate and control a virtual simulation in which a user can interact with virtual characters. The virtual simulation can be, for example, a game, story, or a simulation of a social situation or challenge. The virtual characters in the virtual simulation interact with the user based on strategies, enactments, story events, and tactics dynamically selected for the virtual characters by the Protagonist system 122 depending on the user's input and the virtual simulation being conducted. In effect, virtual characters in the virtual simulation improvise responses based on the user's input. The virtual characters can draw upon a large data store of enactments in order to provide their response to user's input.

The Protagonist system 122 in the memory of the client 120 includes the enactments data 126, tactics data 128, characters data 134, strategies data 130, story events data 132, and user inputs data 136. The enactments data 126, tactics data 128, strategies data 130, story events data 132, and user inputs data 136 can each have constraints or exit conditions to be satisfied, such that when the constraints are satisfied, the corresponding enactment, tactic, strategy, story event, or user inputs can be deemed complete or satisfied by the Protagonist system 122.

The strategies data 130 includes various strategies (or "dynamic modes" or "d-modes") for achieving a desired outcome from a user. The outcome can be, for example, a response from the user that advances a story line of the virtual simulation. The strategies can be embodied by a virtual character. For example, a virtual character can adopt a strategy of being antagonizing, befriending, criticizing, or teasing. A list 160 of exemplary strategies is provided in FIG. 1B. In certain aspects, a strategy includes a goal directed procedure employed by a virtual character to achieve, such as "help the user advance along a dramatic timeline," or, "advance along my own timeline." For example, a virtual character having a mentoring strategy can provide the user with necessary information for the story in which the user is partaking or give the user a clue to advance the story. Each strategy can include a setup, confrontation, and resolution. Each strategy is associated with one or many enactments from the enactments data 126.

Enactments from the enactments data 126 are associated with strategies. Enactments include physical movements and/or verbal utterances for a virtual character to execute to achieve a desired outcome for the associated strategy. For example, for the strategy of antagonizing, the enactments can include yelling "you are worthless" and having the virtual character point at the user (or the user's character). Enactments can include moods, gestures, actions, facial expressions and language.

The characters data 134 includes data for virtual characters (or "protags" or "enactors"), such as the look, sound, and other design elements of a virtual character. A virtual character's behavior is stimulated by input from a user or other virtual characters, the position a user occupies in the virtual timeline, and the current strategy. The virtual character's behavior in turn stimulates the user or other virtual characters. A high-priority factor in the decision of which strategy is selected for a virtual character is what the user's virtual timeline calls for. If a user's timeline in the virtual simulation needs an antagonist, the selected virtual character assembles a list of strategies it can use to foil the user's attempts to progress toward the fulfillment of a driving need. Alternatively, if called, a virtual character can play an ally or a mentor. The motivating force of a virtual character is a "need." The fulfillment of this need is what motivates the virtual character through the virtual simulation's story. This need can be psychological, moral, or physical. For example, a former mercenary might help a group of prostitutes avenge the killing of their sisters because he needs forgiveness for past behavior. Or it could be a simple as a spy needing to stop a criminal from world domination.

Figure 1C:
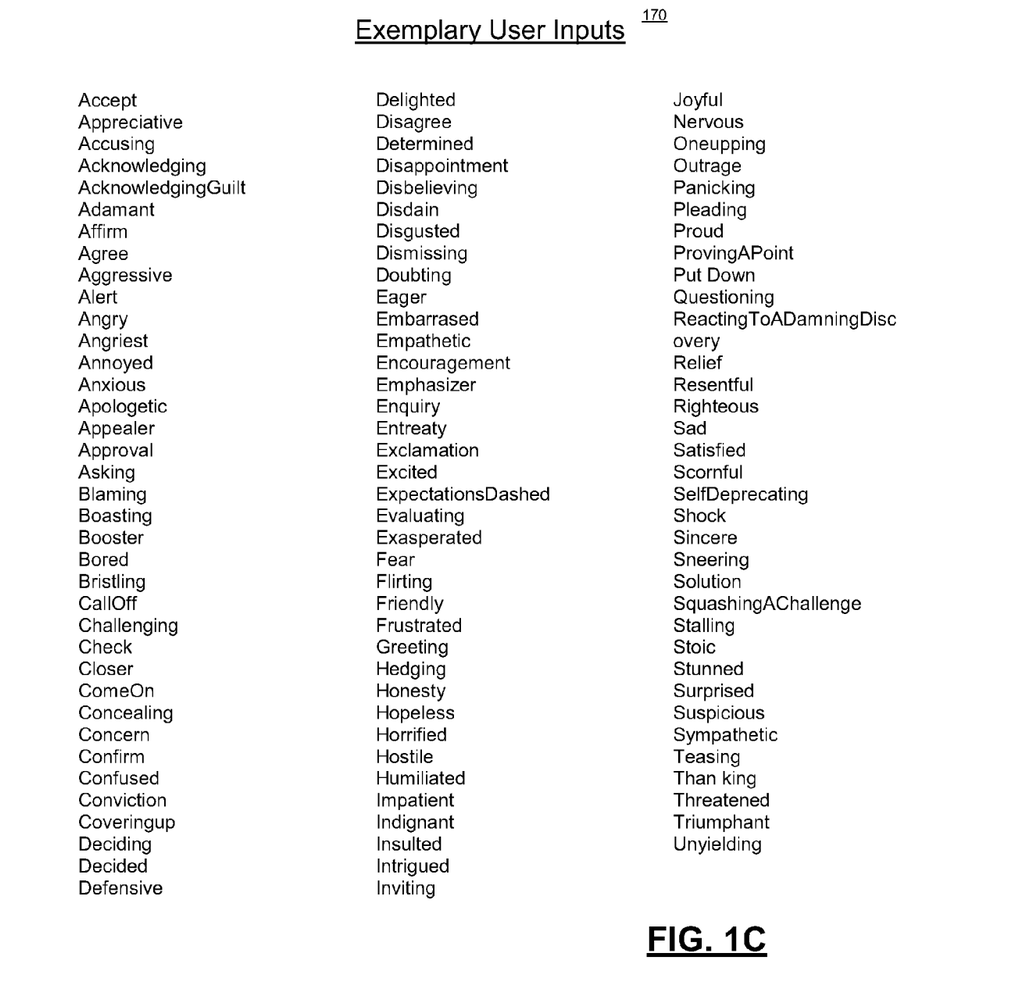
FIG. 1C is an exemplary listing of user inputs from the user inputs data in the memory of the exemplary client of FIG. 1A.

The user inputs data 136 includes data on how to process a user input. For example, if the user input from a motion sensing input device detects a user outstretching a hand and a speech recognition module detects the user saying "Hello, my name is John," then the user's action is associated with the user input of "Greeting" from the user inputs data 136. An exemplary list 170 of user inputs is provided in FIG. 1C.

The tactics data 128 includes information on tactics, which are related to both strategies and enactments. Specifically, each tactic is related to one or many strategies, and each tactic includes the execution of enactments. For example, for the strategy of antagonizing, a virtual character can select the tactic of "demeaning the opponent," in which the virtual character enacts yelling "You are worthless" and having the virtual character point at the user (or the user's character), as discussed above. Similarly, if the tactic is not successful (e.g., if the user response according to the user inputs data 136 indicates the user did not act antagonized), then the user can adopt a different tactic for the same strategy of antagonizing, such as "bullying" the user.

The story events data 132 includes story events for the virtual simulation. The story events are dynamically placed in a sequence during the virtual simulation in order to create a narrative timeline for the user. Certain story events, such as an "inciting incident" story event, can be weighted to increase their chances of being selected to occur early on in the simulation, while other story events, such as a "happy ending" story event, can be weighted to increase their chances of being selected to occur later on in the simulation. The story events data 132 also includes information on generating a timeline for the user, and determining when story events in the timeline are complete so that another story event can be initiated or the timeline can end. For example, for the story event "inciting incident," the user is intended to be forced into a situation, such as seeing someone murdered, being approached and asked to deliver a message, receive mysterious phone call, or witnessing a sabotaged drug deal. As a result, the strategy adopted by a virtual character for a selected story can be based on the current story event, previous story event, or next story event. For example, for the story event "inciting incident," a virtual character can adopt a strategy of "pleading for help" in order to create an inciting incident for the user.

Exemplary story events in the story events data 132 include defining a problem (e.g., where a theme is stated), metaphor, meeting your associate, a call (e.g., being asked for a favor), a MacGuffin (e.g., where an imaginary plot is established), a plot coupon (e.g., an object is presented whose possession or use is necessary in order to resolve a conflict upon which a plot hangs), a plot voucher (e.g., a useful item is presented to the user with an unspecified purpose that later becomes useful for resolving a situation), and Chekhov's Gun (e.g., introducing an object in a story to use later on). Exemplary story events also include a controlling idea, prefiguring, meeting a mentor, illuminating a backstory, comic relief, defining a problem, crossing a first threshold, rebirth, confronting an antagonizing agent, undergoing a test, and reversal. Exemplary story events further include a hitch, gaining an ally, making an enemy, antagonist obstacle, a point of no return, approaching confrontation, an ordeal, a road home, a reward, a red herring (e.g., a plot device intended to distract the user from a more important event in the plot), a chase scene, a deathtrap (e.g., an overly complicated method of killing a character, typically used by a villain), a discovery (e.g., sudden realization of events or relations with other characters), eavesdropping (e.g., surreptitious listening to others conversations), and fictional character (e.g., a fictional character known to be fictional by the characters in the story). Exemplary story events in the story events data 132 yet further include a flashing arrow (e.g., explicit and obvious reference to a person or object in a story), foreshadowing (e.g., giving subtle hints of events to come in the story), frame story (e.g., a main story being told in the form of smaller stories), a framing device (e.g., a single event or object having heightened significance), a happy ending (e.g., where most everything turns out for the best), a MacGuffin (e.g., a plot device having little relevance to the story), a Mexican standoff (e.g., where two or more people are trapped in an impasse where neither can win), a narrative hook (e.g., an event which reverses the meaning of everything), a plot dump/exposition (e.g., explaining prior events occurring in the story), a plot point (e.g., an event that changes the direction of the plot and the story), a plot twist (e.g., an event which completely reverses the plot or story), a pyrrhic victory (e.g., where someone wins an outcome, but the result of the "win" is disastrous) a self-fulfilling prophecy (e.g., a prediction of a future event, where the prediction of the event causes the event), and a side story (e.g., an additional story taking place at the same time as the main story).

The processor 112 is configured to execute instructions, such as instructions physically coded into the processor 112, instructions received from software in memory 120 (e.g., the simulator 124), or a combination of both. For example, the processor 112 of the client 110 executes instructions to receive a request (e.g., from the user) to generate a virtual simulation between the user and a virtual character, and generate the virtual simulation for the user that includes the virtual character. The processor 112 also determines a desired outcome from the user within the virtual simulation, selects a strategy, from the strategies data 130, for achieving the desired outcome from the user, and selects an enactment from the enactments data 126 for the selected strategy for the virtual character to execute to achieve the desired outcome from the user in the virtual simulation. The processor 112 controls the virtual character to execute the selected enactment for the selected strategy to achieve the desired outcome from the user in the virtual simulation.

The processor 112 can further receive an input from the user in response to the executed enactment, and determine whether the desired outcome from the user was achieved. The determination can be made, for example, by the processor 112 processing the user input using speech recognition, natural language recognition, motion recognition, and other technologies well known to those of ordinary skill in the art, against user inputs in the user inputs data 136, to determine the type of user input received. The processor 112 can then select a subsequent strategy, from the strategies data 130, and a subsequent enactment, from the enactments data 126, to achieve the desired outcome when it is determined the desired outcome was not achieved from the user. Similarly, when it is determined the desired outcome was achieved from the user, the processor 112 can select a subsequent story event, from the story events data 132, to continue the virtual simulation with the user. The processor 112 is configured to complete the virtual simulation when a desired outcome is achieved from the user for a final story event selected from the story events data 132. In certain aspects, because a virtual character is programmed to speak and to react based on speech processed using natural language recognition, human beings can be considered by the Protagonist system 122 as identical to the computer driven virtual characters.

The processor 112 is also configured to select a virtual character from characters data 134 based on the current story event. For example, if the current story event is a "side story," then a virtual character that the user has not seen before can be selected in order to create a side story from the primary story in the virtual simulation. The processor 112 is configured to select a subsequent story event from the story events data 132 based on the current story event, a previous story event, and information on the user. The information on the user can be obtained, for example, based on answers to a series of questions presented to the user before beginning the virtual simulation.

In certain aspects, the client 110 can obtain the Protagonist system 122 from a server over a network (not illustrated) connected to the communications module 118. The communications module 118 is configured to interface with a network to send and receive information, such as data, requests, responses, and commands to other devices on the network, and can be, for example, a modem or Ethernet card.

The server can be any device having an appropriate processor, memory, and communications capability for hosting the Protagonist system 122. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
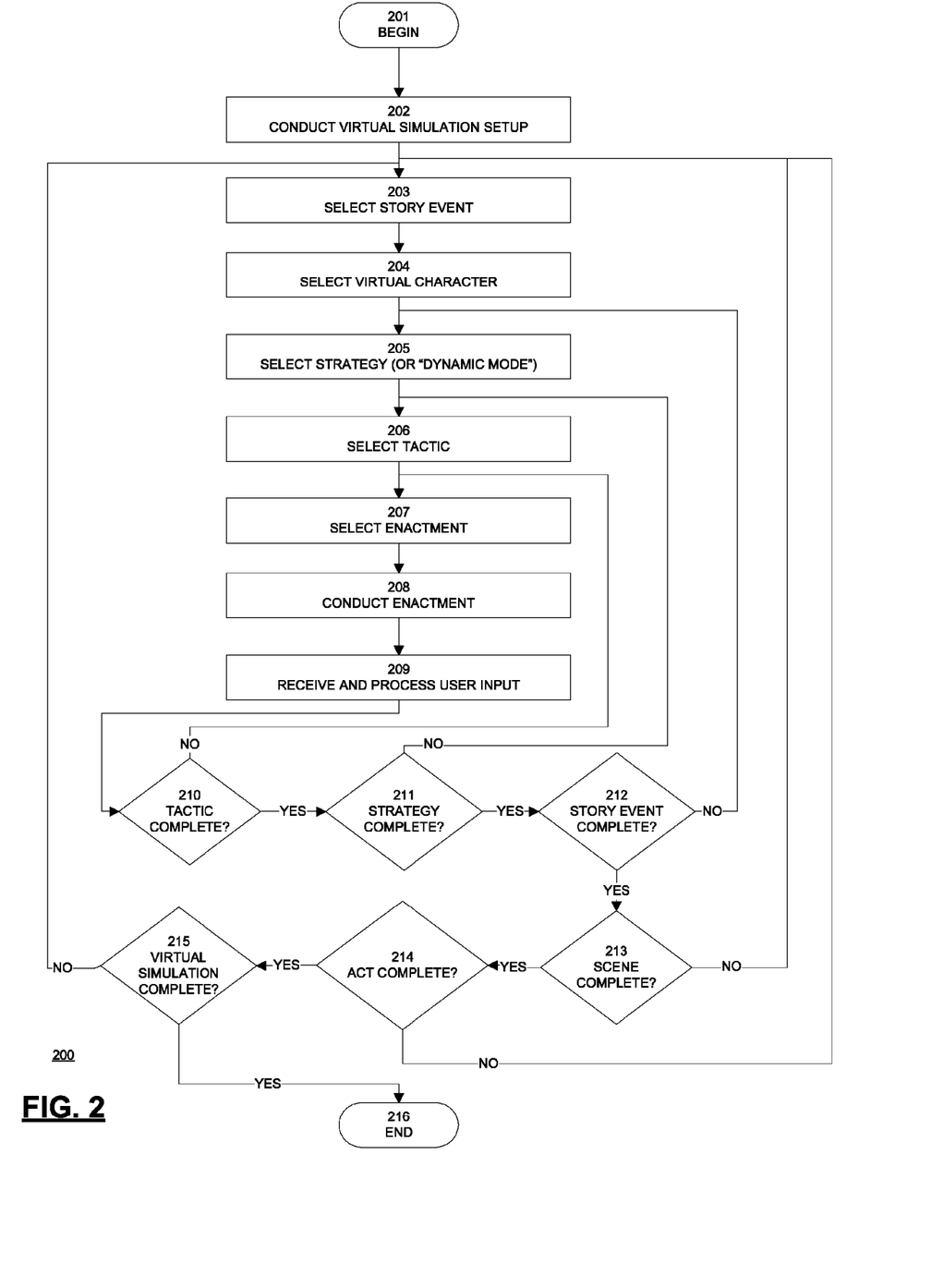
FIG. 2 illustrates an exemplary process for conducting a virtual simulation according to certain aspects of the disclosure.

FIG. 2 illustrates an exemplary process 200 for conducting a virtual simulation according to certain aspects of the disclosure. The process 200 proceeds from beginning step 201 to step 202 when a user loads the Protagonist system 122 on a client 110. In step 202, the Protagonist system 122 conducts a virtual simulation setup, in which the Protagonist system 122 is provided with information on the user. In step 203, a story event is selected from the story events data 132 for the first act and first scene of the storyline by the Protagonist system 122. The story event is selected based on, for example, the current act or scene of the storyline, any pre-defined weight associated with the story event, the results of the virtual simulation setup in step 202, and the previous story event, if any. Next, in step 204, a virtual character is selected from the characters data 134 for the selected story event by the Protagonist system 122. The virtual character is selected based on, for example, the selected story event of step 203, the results of the virtual simulation setup in step 202, and any previously selected virtual characters. In step 205, a strategy is selected from the strategies data 130 by the Protagonist system based on, for example, any strategies that were previously selected. A tactic is then selected in step 206 from the tactics data 128 by the Protagonist system 122 based on the selected strategy, any user input received in response to a previously selected strategy, a previously selected tactic, the user's position in the storyline, or randomly. In step 207, an enactment is selected for the selected tactic of step 206 by the Protagonist system 122 based on, for example, the selected tactic and/or a previously selected enactment.

The selected virtual character conducts the selected enactment for the selected tactic of the selected strategy in the selected story event in step 208, and awaits a user response, for example, for a time period determined by the selected strategy or the selected tactic. The user's response is received and processed against the user inputs data 136 in step 209. If the tactic is determined to be complete in step 210 (e.g., if the user's response to the tactic is satisfactory), the process 200 proceeds to step 211, otherwise the process returns to step 207 in which an enactment is again selected for the previously selected tactic in order to achieve a satisfactory response from the user. In step 211, if the strategy is determined to be successful (e.g., if the constraints of the strategy are determined to be satisfied), the process 200 proceeds to step 212, otherwise the process 200 returns to step 206 in which a tactic is again selected for the previously selected strategy in order to achieve a satisfactory response from the user. In step 212, if the story event is determined to be complete (e.g., if the constraints of the story event are determined to be satisfied), then the process 200 proceeds to step 213, otherwise the process 200 returns to step 205 in which a strategy is again selected for the previously selected virtual character in order to achieve a satisfactory response from the user.

Figure 3:
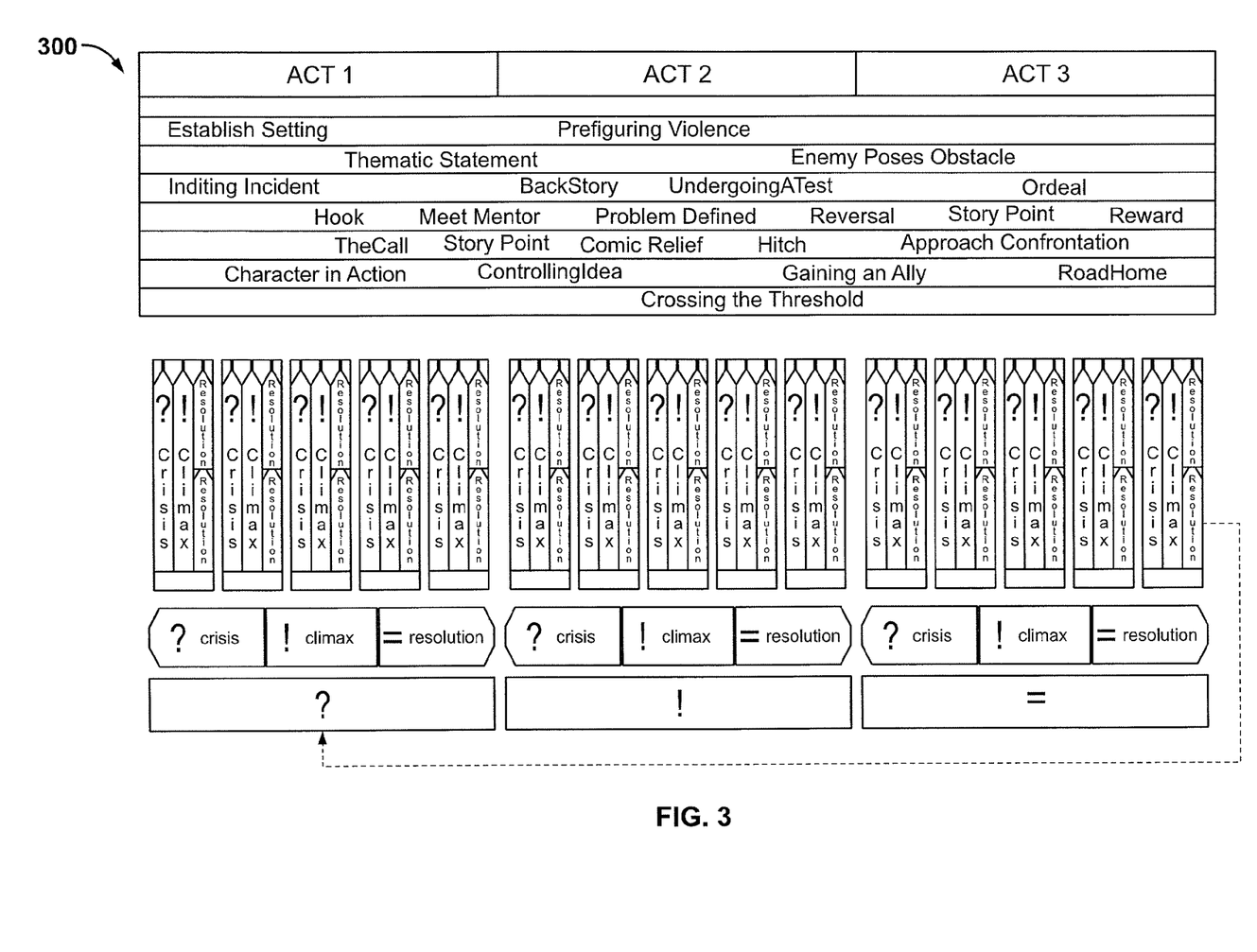
FIG. 3 is an exemplary outline of story events for a virtual simulation conducted according to the exemplary process of FIG. 2

In step 213, if the scene is determined to be complete (e.g., if the constraints of the scene are determined to be satisfied), the process 200 proceeds to step 214 for a next scene (if necessary), otherwise the process 200 returns to step 203 in which a story event is selected for the same scene. In step 214, if the act is determined to be complete, then the process 200 proceeds to step 215 for a next act (if necessary), otherwise the process 200 returns to step 203 in which a story event is selected for a new scene. The determination of whether another scene or act is necessary can be based on the current position in the storyline, and whether a crisis, climax, and/or resolution has been achieved from the selected story events. An exemplary outline 300 for a story line of story events is illustrated in FIG. 3. In step 215, if the virtual simulation (e.g., a story line in the virtual simulation) is determined to be complete, the process 200 ends in step 216, otherwise the process 200 returns to step 203 to select a new story event for a new act.

FIG. 2 set forth an exemplary process 200 for conducting a virtual simulation using the exemplary client 110 of FIG. 1A. An example will now be described using the exemplary process 300 of FIG. 3, and a virtual simulation of the City of Mimick. The City of Mimick is a navigable simulation of a city where the user's virtual character has become an agent in a government sponsored intelligence service called the 113.

The process 200 proceeds from beginning step 201 to step 202 when a user loads the Protagonist system 122 on a client 110. In step 202, the Protagonist system 122 conducts a virtual simulation setup, in which the Protagonist system 122 performs a short test to determine the user's preconceptions.

The Protagonist system 122 then informs the user that the user will play the role of a virtual character, a spy agent, Deet Matrix, in the spy agency 113. In step 203, the Protagonist system 203 determines that the user has story events of the following types available due to the user's early position in the dynamic narrative timeline: inciting incident, problem defined, metaphor, meet your buddy, the call, MacGuffin, plot coupon, plot voucher, Chekhov's gun, controlling idea, prefiguring, and meet mentor. Because the timeline is in act one, only story events within act one are considered. The previously identified story events deemed to be available are predefined with extra weight as being good story starters.

Figure 4:
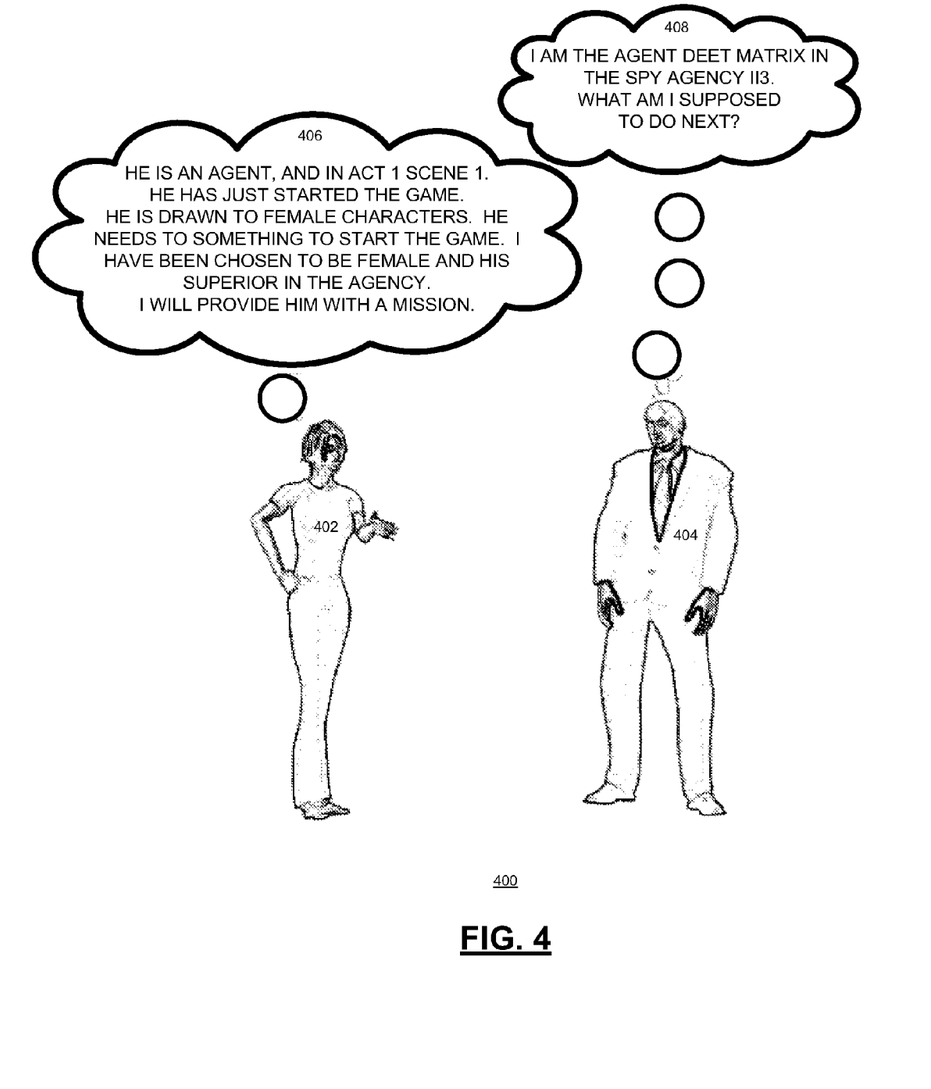
FIG. 4 is an exemplary illustration of an interaction between two virtual characters according to the exemplary process of FIG. 2.

The story event "the call" is selected in step 203 by the Protagonist system 122. The story event "the call" is selected in step 202 the user was evaluated to be romantic based on the user's responses, and "the call" was the single story event matching for a user determined to be romantic. For the selected story event "the call," a specified version of the story event "the call," titled "Spy Ed 101" is selected, from among "Spy Ed 101," "the MadBomber," and "Meet Power," because "Spy Ed 101" is evaluated as most relevant due the user's revealed affinity for attractive women in the virtual simulation setup of step 202. Only "Spy Ed 101" featured an attractive female virtual character. The virtual character "Katherine Hammond" is selected as the female virtual character in step 204, playing the role of the Deet Matrix's boss from II3. The selected virtual character Katherine then approaches the user on a street in the virtual simulation with the dramatic purpose of issuing the call to action (e.g., for the story event selected in step 203). FIG. 4 is an exemplary illustration 400 of this stage of the virtual simulation between the virtual character Katherine Hammond 400, her purpose 406, the user's virtual character Deet Matrix 404, and his position 408 in the storyline.

In step 205, the following strategies are available to the virtual character Katherine: identifying, attracting, assigning, befriending, beguiling, belittling, benign interrogation, bewitching, challenging, calling, charming, explaining, conspiring, teasing, tempting, testing, and testing allegiance. Of these strategies, the Protagonist system 112 selects the strategy "identifying" to initiate the interaction between Katherine and Deet, because the strategy "identifying" was the only strategy tagged for beginning a scene. The strategy "identifying" is a persistent strategy designed to invoke tactic after tactic until the user utters a pre-designated user input to the virtual character. If the user input is not uttered by the user, the virtual character ends the interaction. A proximity threshold around the player and/or the passage of time since the last significant action by the user or event in the virtual simulation triggers a virtual character's entry into the user's view. If, however, there have been no significant actions or events, which is the case in this example because the virtual simulation has just begun, a significant action or event is presented to the user.

The tactic "calling for attention," in which the virtual character approaches the player and calls his attention, is selected in step 206 based on the selected strategy of "identifying." "Calling for attention" includes a list of enactments to be selected at random in step 207 until the user's attention is determined to have been won by the user's virtual character, Deet, engaging in conversation with the virtual character Katherine Hammond. At this point the tactic "calling for attention" will be satisfied. The enactment "you don't know me but" is selected in step 207. In step 208, the enactment "you don't know me but" is conducted, consisting of the virtual character Katherine holding her hand out and saying "you don't know me, but we need to talk." The user does not respond. In step 209, because the user does not respond within three seconds, the process 200 in step 210 determines the tactic to have been unsuccessful and returns to step 207, in which the Protagonist system 122 selects another enactment by weighing factors relevant to the current state of the virtual simulation, the enactment "excuse me." In step 208, the enactment "excuse me" is conducted in which the virtual character Katherine taps Deet's shoulder and says "excuse me." In step 209, the user's character Deet responds by turning to face Katherine and saying "what's up," which is processed in step 209 again the user inputs data 136 as a greeting. The tactic "calling for attention" is determined to successful in step 210 (e.g., the user's input added enough weight to a factor "AttentionGained" for the selected tactic "calling for attention" to be satisfied), and the process 200 proceeds to step 211 in which an assessment is made as to whether the strategy "identifying" has been satisfied or completed.

The strategy of "identifying" is determined to be incomplete in decision step 211 because it consist of multiple stages, so the process 200 returns to step 206, in which the next tactic for the strategy "identifying" is selected, namely the tactic "naming." The tactic "naming" includes one enactment, also titled "naming," which is selected in step 207. The enactment "naming" is conducted in step 208 by the virtual character Katherine Hammond pointing at the user's character Deet and saying "You are [PLAYERS ROLE]," namely, "You are Deet Matrix." The user in step 209 responds by saying "And you are?" This response is interpreted in step 209 against the user inputs data 136 as "questioning" and "asking a name." In step 210, the tactic "naming" is determined to be complete, so the process 200 proceeds to step 211 in which the strategy is again determined to be incomplete due to another remaining tactic of the strategy "identifying" needing completion, so the process 200 returns to step 206 in which the tactic "introducing" is selected. The tactic "introducing" is configured to have the virtual character provide an introduction and describe a mission for the user by holding out a hand, having the virtual character name itself, and describe a mission for the user. The tactic is then considered completed if the user responds appropriately.

Thus, in step 208, the virtual character Katherine introduces herself by holding out her hand and saying "I'm Katherine Hammond, your superior in 113, and your mission is to follow that Senator over there." In step 209, the user virtual character Deet Matrix shakes Katherine's hand and begins moving in the direction pointed by Katherine, which is determined in step 210 to be a completion of the tactic. The strategy 211 of "identifying" is determined to be completed in step 211, and in step 212 the story event "the call" is determined to be complete 212. The process 200 proceeds to step 213, in which a next scene is then entered, if relevant, then eventually step 214, for the next act, until the user completes the virtual simulation (e.g., a story line in the virtual simulation) in step 215 by completing the mission that began by following the senator. The process 200 then ends in step 216.

Figure 5:
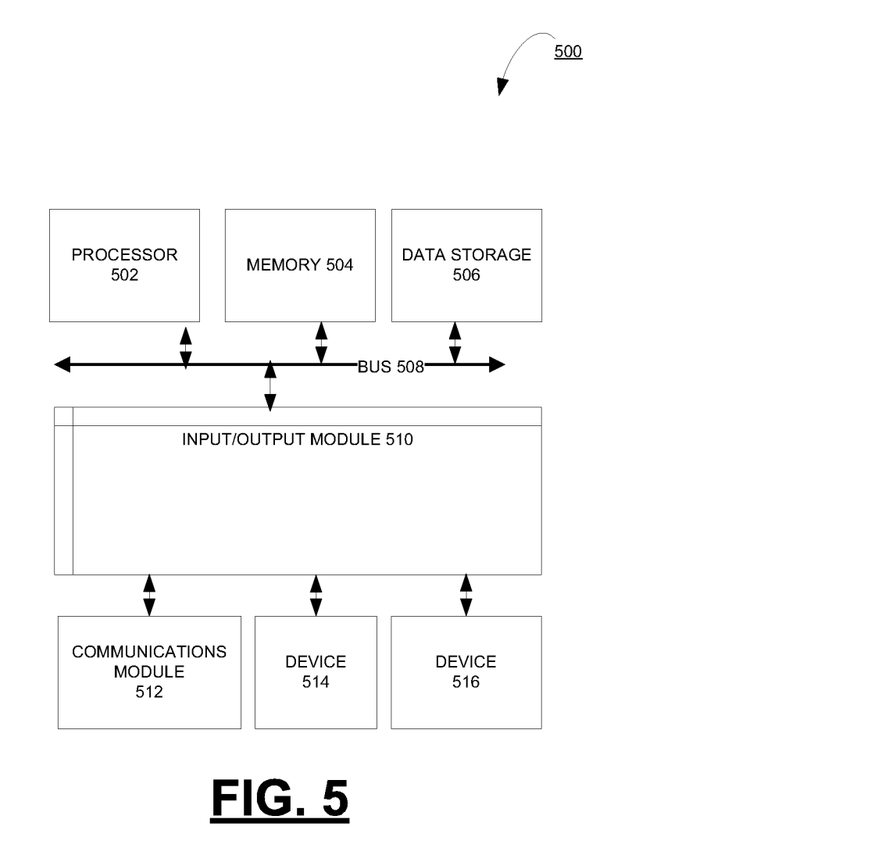
FIG. 5 is a block diagram illustrating an exemplary computer system with which the client of FIG. 1A can be implemented.

FIG. 5 is a block diagram illustrating an exemplary computer system 500 with which the client of FIG. 1A can be implemented. In certain aspects, the computer system 500 may be implemented using hardware or a combination of software and hardware, either in a dedicated server, or integrated into another entity, or distributed across multiple entities.

Computer system 500 (e.g., client 110) includes a bus 508 or other communication mechanism for communicating information, and a processor 502 (e.g., processor 112) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 120), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications module 118) include networking interface cards, such as Ethernet cards and modems. In certain aspects, the input/output module 510 is configured to connect to a plurality of devices, such as an input device 514 (e.g., input device 116) and/or an output device 516 (e.g., output device 114). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method for conducting a virtual simulation between a user and a virtual character, the method comprising:
   receiving a request to generate a virtual simulation between a user character of a user and a virtual character;
   generating the virtual simulation for the user that includes the user character and the virtual character;
   determining a desired outcome from the user within the virtual simulation;
   selecting a strategy, from among a plurality of strategies, for achieving the desired outcome from the user;
   selecting an enactment for the selected strategy, from among a plurality of enactments, for the virtual character to execute to achieve the desired outcome from the user in the virtual simulation; and
   controlling the virtual character to execute the selected enactment for the selected strategy to achieve the desired outcome from the user in the virtual simulation.

2. The method of claim 1, further comprising:
   receiving an input from the user in response to the executed enactment;
   determining whether the desired outcome from the user was achieved; and
   selecting a subsequent strategy, from among the plurality of strategies, and a subsequent enactment, from among the plurality of enactments, to achieve the desired outcome when it is determined the desired outcome was not achieved.

3. The method of claim 1, wherein the virtual simulation comprises multiple story events, and the strategy is selected based on a current story event of the virtual simulation.

4. The method of claim 3, further comprising:
   receiving an input from the user in response to the executed enactment;
   determining whether the desired outcome from the user was achieved;
   selecting a subsequent story event, from the multiple story events, to continue the virtual simulation with the user when it is determined the desired outcome was achieved.

5. The method of claim 3, wherein the virtual character is selected, from among a plurality of virtual characters, based on the current story event.

6. The method of claim 3, wherein the virtual simulation comprises multiple story events, and the current story event is selected based on at least one of the current story event, a previous story event, and information on the user.

7. The method of claim 6, wherein the information on the user is obtained by presenting queries to the user and receiving responses to the queries from the user.

8. The method of claim 3, wherein the virtual simulation is completed when a desired outcome is achieved from the user for a final story event selected from the multiple story events.

9. The method of claim 1, wherein the enactment comprises at least one of a physical movement by the virtual character or a verbal utterance by the virtual character.

10. A system for conducting a virtual simulation between a user and a virtual character comprising:
- a memory comprising:
  - a group of strategies for achieving one or more desired outcomes from a user;
  - a group of enactments, associated with the strategies, for a virtual character to execute to achieve the one or more desired outcomes from the user for a corresponding strategy;
- a processor configured to:
  - receive a request to generate a virtual simulation between a user character of a user and a virtual character;
  - generate the virtual simulation for the user that includes the user character and the virtual character;
  - determine a desired outcome from the user within the virtual simulation;
  - select a strategy, from the group of strategies, for achieving the desired outcome from the user;
  - select an enactment from the group of enactments for the selected strategy for the virtual character to execute to achieve the desired outcome from the user in the virtual simulation; and
  - control the virtual character to execute the selected enactment for the selected strategy to achieve the desired outcome from the user in the virtual simulation.

11. The system of claim 10, wherein the processor is further configured to:
- receive an input from the user in response to the executed enactment;
- determine whether the desired outcome from the user was achieved; and
- select a subsequent strategy, from the group of strategies, and a subsequent enactment, from the group of enactments, to achieve the desired outcome when it is determined the desired outcome was not achieved.

12. The system of claim 10,
wherein the memory comprises a group of story events,
wherein the virtual simulation comprises a subset of the group of story events, and
wherein the strategy is selected based on a current story event of the virtual simulation.

13. The system of claim 12,
wherein the memory comprises a group of story events, and wherein the processor is further configured to:
- receive an input from the user in response to the executed enactment;
- determine whether the desired outcome from the user was achieved;
- select a subsequent story event, from the group of story events, to continue the virtual simulation with the user when it is determined the desired outcome was achieved.

14. The system of claim 12, wherein the memory comprises a group of virtual characters, and wherein processor is configured to select the virtual character from the group of virtual characters based on the current story event.

15. The system of claim 12, wherein the memory comprises a group of story events, and wherein processor is configured to select the current story event based on at least one of the current story event selected from the group of story events, a previous story event selected from the group of story events, and information on the user.

16. The system of claim 15, wherein the processor is configured to obtain the information on the user by presenting queries to the user and receiving responses to the queries from the user.

17. The system of claim 15, wherein the processor is configured to complete the virtual simulation when a desired outcome is achieved from the user for a final story event selected from the group of story events.

18. The system of claim 10, wherein the enactment comprises at least one of a physical movement by the virtual character or a verbal utterance by the virtual character.

19. A virtual simulation between a user and a virtual character comprising:
- a virtual world generated using a processor;
- a user character within the virtual world;
- a virtual character within the virtual world configured to interact with the user character to achieve a desired outcome from the user character,
- wherein the virtual character is configured to execute a selected enactment, selected from a group of enactments, for a selected strategy, selected from a group of strategies, to achieve the desired outcome from the user character in the virtual simulation.

20. A non-transitory machine-readable storage medium comprising machine-readable instructions for causing a processor to execute a method for conducting a virtual simulation between a user and a virtual character, comprising:
- receiving a request to generate a virtual simulation between a user character of a user and a virtual character;
- generating the virtual simulation for the user that includes the user character and the virtual character;
- determining a desired outcome from the user within the virtual simulation;
- selecting a strategy, from among a plurality of strategies, for achieving the desired outcome from the user;
- selecting an enactment from among a plurality of enactments for the selected strategy for the virtual character to execute to achieve the desired outcome from the user in the virtual simulation; and
- controlling the virtual character to execute the selected enactment for the selected strategy to achieve the desired outcome from the user in the virtual simulation.

* * * * *